K. F. STAHL.
APPARATUS FOR ABSORBING HYDROFLUOSILICIC ACID GAS AND SEPARATING SILICIC ACID THEREFROM.
APPLICATION FILED AUG. 18, 1917.

1,315,250.

Patented Sept. 9, 1919.

WITNESSES
J. Herbert Bradley
Glenn H. Leresche

INVENTOR
Karl F. Stahl,
By Fred'k N. Winter
Attorney.

UNITED STATES PATENT OFFICE.

KARL F. STAHL, OF PITTSBURGH, PENNSYLVANIA.

APPARATUS FOR ABSORBING HYDROFLUOSILICIC-ACID GAS AND SEPARATING SILICIC ACID THEREFROM.

1,315,250.   Specification of Letters Patent.   Patented Sept. 9, 1919.

Application filed August 18, 1917. Serial No. 187,018.

*To all whom it may concern:*

Be it known that I, KARL F. STAHL, a resident of Pittsburgh, in the county of Allegheny and State of Pennsylvania, have invented a new and useful Improvement in Apparatus for Absorbing Hydrofluosilicic-Acid Gas and Separating Silicic Acid Therefrom, of which the following is a specification.

This invention relates to apparatus for treating the gases resulting from acidulating phosphate rock to obtain aqueous hydrofluosilicic acid and to separate the suspended silicious acid from the gases.

In the manufacture of acid phosphate from phosphate rock, the treatment of the phosphate rock with sulfuric acid produces silicon fluorid, which is decomposed in a suitable apparatus by water sprays to hydrofluosilicic acid and silicic acid. The silicic acid separates in the form of fine flakes, resembling snow, while the hydrofluosilicic acid is partly dissolved in the mist of water and the rest probably exists as $H_2SiF_6$ in the gaseous state or as its components, silicon fluorid ($SiF_4$) and hydrogen fluorid (HF). The decomposition of the silicon fluorid however may not be complete in the first apparatus so that the vapors or gases resulting from the first treatment by water sprays consist of certain parts of undecomposed silicon fluorid, hydrofluosilicic acid partly as a gas (or partly dissociated into its components silicon fluorid and hydrogen-fluorid) and partly dissolved in water as a mist, and silicic acid in the form of fine flakes suspended in the gases.

The present invention comprises an apparatus for treating said vapors to decompose any silicon fluorid which may still be present, separate the silicic acid which is suspended in the gases and absorb the hydrofluosilicic acid. Generally stating the apparatus comprises a closed circular chamber into which the vapors are introduced near the bottom and tangentially to the periphery of the chamber, whereby the vapors are given a rotary motion to thereby thoroughly mix the gases and absorb the hydrofluosilicic acid in water sprays, the silicic acid being thrown out and separated from the gases in the form of a sludge, while the gases which are not absorbed are taken out centrally through the top of the chamber.

Figure 1:
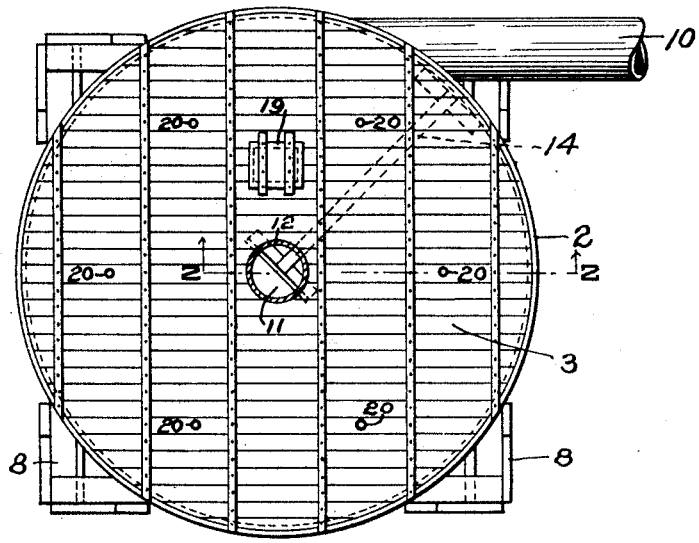
Figure 2:
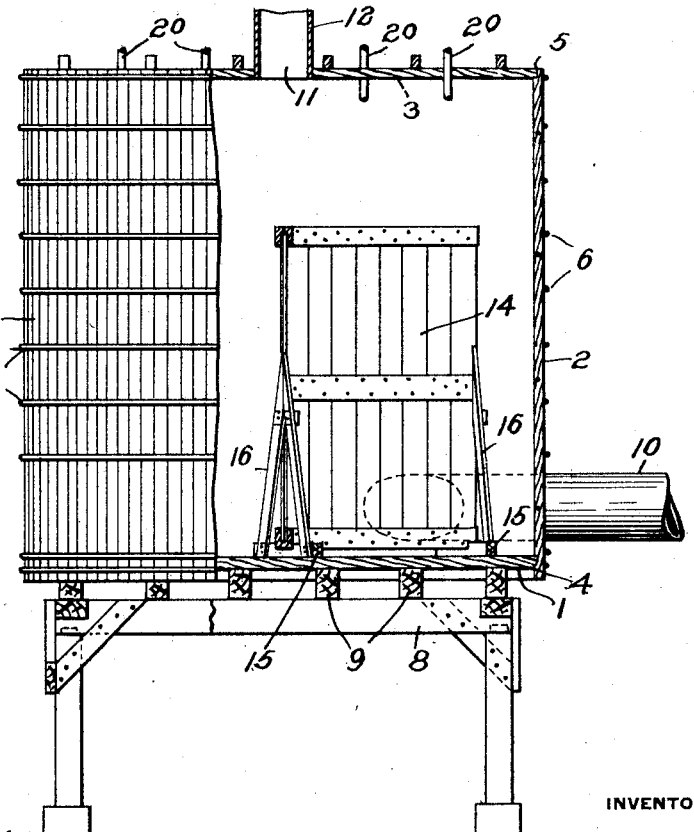

In the accompanying drawings, Figure 1 is a plan view illustrating the apparatus; and Fig. 2 is in part an outside elevation and in part a vertical sectional elevation on the line 2—2, Fig. 1.

The apparatus comprises a suitable tank or reservoir, of circular shape, as shown, which may be constructed of concrete or masonry, but is shown constructed of wood, having a bottom 1, side walls 2, and cover 3. This tank may be built up in any suitable way, preferably having the side walls constructed of vertical staves with the edges of the bottom slightly mortised into the same, as at 4, and with the cover 3 setting down in rabbets 5 in the top of the side walls, the whole being bound by hoops or bands 6. This reservoir can be erected upon any base, such as the skeleton or trestle-work shown generally at 8, and having a number of cross beams 9 upon which the bottom 1 is built.

The inlet for the gas is through a pipe or conduit 10 connected with an opening formed in the side wall near the bottom of the tank, said pipe being arranged tangentially to the periphery of the tank so that the entering gases will be given a whirling motion. The outlet is through a central top opening 11 to which is connected a pipe 12 for conducting the gas to suitable condensers.

The whirling movement imparted to the gas has the effect of throwing out the silicic acid, which mixed with hydro-fluosilicic acid comes down in the form of a sludge, and runs out of the tank by gravity through openings in its bottom (not shown). To assist in separating the silicic acid from the gas, I may place in the tank one or more baffles 14, which preferably will be built up independently of the tank, as shown, and will be made of wood, concrete or masonry, because the hydro-fluosilicic acid is destructive to metal parts. As shown, this baffle has foot portions 15 upon which the vertical baffle plate 14 rests and to which it is connected by braces 16. Cross strips 17 for connecting the vertical boards or strips are shown at the top and bottom and middle of the baffle. All of the parts of this trestle are shown as united by means of wooden pins, thus obviating the use of any metal whatsoever. A baffle is not absolutely necessary.

The top 3 is provided with a manhole to permit entrance to the interior of the tank and this is closed by a wooden cover 19.

Water is sprayed into the tank through a series of spray nozzles 20, projecting through the top of the tank and connected to a suitable water supply (not shown). These nozzles supply very fine sprays on the tank and the whirling gas coming in contact with such spray is mixed therewith and thoroughly absorbed.

All of the parts which are in any manner exposed to the hydro-fluosilicic acid are constructed of wood, concrete or masonry. If wood is used it is specially treated to make it more resistant to the action of the acid. To this end it is first treated with a coat of benzin or gasolene paint, or other suitable thin paint or varnish which will penetrate deeply into the wood, and is then treated with a heavy paint, such as asphaltum paint, which forms a dense, thick, impervious surface coating. In this way the wood tank is rendered very durable.

Various modifications obviously can be made in the details of construction.

What I claim is:—

1. Apparatus for treating the gases resulting from acidulating phosphate rock to obtain aqueous hydrofluosilicic acid and to separate the suspended silicious acid from the gases, comprising a circular closed chamber or tank having a tangentially arranged gas inlet at its bottom and a centrally located gas outlet at its top, and means for spraying water into said tank.

2. Apparatus for treating the gases resulting from acidulating phosphate rock to obtain aqueous hydrofluosilicic acid and to separate the suspended silicious acid from the gases, comprising a circular closed chamber or tank having its bottom, top and walls treated with an impervious inert paint and having a tangentially arranged gas inlet at its bottom and a centrally located gas outlet at its top, and means for spraying water into said tank.

3. Apparatus for treating the gases resulting from acidulating phosphate rock to obtain aqueous hydrofluosilicic acid and to separate the suspended silicious acid from the gases, comprising a circular closed chamber or tank having its bottom, top and walls formed of wood and treated with substances to protect them from the action of the acid, and having a tangentially arranged gas inlet at its bottom and a centrally located gas outlet at its top.

4. Apparatus for treating the gases resulting from acidulating phosphate rock to obtain aqueous hydrofluosilicic acid and to separate the suspended silicious acid from the gases, comprising a circular closed wooden chamber or tank having its inner surface treated with a penetrating paint and with a heavy surface coating paint, and having a tangentially arranged gas inlet at its bottom and a centrally located gas outlet at its top.

5. Apparatus for treating the gases resulting from acidulating phosphate rock to obtain aqueous hydrofluosilicic acid and to separate the suspended silicious acid from the gases, comprising a circular closed chamber or tank having a tangentially arranged gas inlet at its bottom and a centrally located gas outlet at its top, and a baffle in said chamber extending from its side wall inwardly toward its center.

In testimony whereof, I have hereunto set my hand.

KARL F. STAHL.

Witness:
G. H. LERESCHE.

Copies of this patent may be obtained for five cents each, by addressing the "Commissioner of Patents, Washington, D. C."